(12) United States Patent
Park (10) Patent No.: US 7,574,617 B2
(45) Date of Patent: Aug. 11, 2009

(54) ELECTRONIC DEVICE AND CONTROL METHOD THEREOF

(75) Inventor: Hee-jun Park, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 317 days.

(21) Appl. No.: 10/974,676

(22) Filed: Oct. 28, 2004

(65) Prior Publication Data

US 2005/0268134 A1  Dec. 1, 2005

(30) Foreign Application Priority Data

Apr. 8, 2004  (KR)  ............... 10-2004-0024231

(51) Int. Cl.
 *G06F 1/32* (2006.01)
(52) U.S. Cl. .................................... 713/320
(58) Field of Classification Search ........ None
 See application file for complete search history.

(56) References Cited

U.S. PATENT DOCUMENTS

| | | | | |
|---|---|---|---|---|
| 7,148,670 | B2* | 12/2006 | Inn et al. ............... | 323/283 |
| 2002/0043963 | A1* | 4/2002 | Malik et al. ............ | 323/276 |
| 2002/0053037 | A1 | 5/2002 | Lee | |
| 2002/0190696 | A1* | 12/2002 | Darshan ............... | 323/207 |
| 2003/0025484 | A1* | 2/2003 | Edwards ............... | 323/288 |
| 2003/0231003 | A1* | 12/2003 | Ballard et al. ........... | 320/116 |
| 2004/0027099 | A1* | 2/2004 | Fujii ..................... | 323/234 |
| 2004/0263330 | A1* | 12/2004 | Alarcon ................ | 340/539.23 |

FOREIGN PATENT DOCUMENTS

| | | |
|---|---|---|
| JP | 04-347541 | 12/1992 |
| JP | 2002-186177 | 6/2002 |
| KR | 1995-0025507 | 9/1995 |
| KR | 2003-0030333 | 4/2003 |

OTHER PUBLICATIONS

Notice of Official Action issued by the Korean Intellectual Property Office dated Nov. 17, 2005 in Application No. 10-2004-0024231.

* cited by examiner

*Primary Examiner*—Thomas Lee
*Assistant Examiner*—Mohammed H Rehman
(74) *Attorney, Agent, or Firm*—Staas & Halsey LLP (57) ABSTRACT

An electronic device with a plurality of electronic components, the electronic device includes a microcomputer, a first regulator supplying power required to drive the microcomputer in a first mode of the electronic device, a second regulator supplying power required to drive at least one among the plurality of electric components in a second mode of the electronic device, and a controller controlling the power from the second regulator to be employed as power for driving the microcomputer when the electronic device operates in the second mode. With this configuration, the electronic device, especially in a case of a portable electronic device using a battery, has a longer running time and a life span of a battery is increased.

12 Claims, 7 Drawing Sheets

ELECTRONIC DEVICE AND CONTROL METHOD THEREOF

CROSS-REFERENCE TO RELATED APPLICATIONS

This application claims the benefit of Korean Patent Application No. 2004-24231, filed Apr. 8, 2004 in the Korean Intellectual Property Office, the disclosure of which is incorporated herein by reference.

BACKGROUND OF THE INVENTION

1. Field of the Invention

The present invention relates to an electronic device and a control method thereof, and more particularly, to an electronic device and a control method thereof, in which power required to drive the electronic device is relatively low, for example, in the case of a portable electronic device using a battery, a running time and a life span of a battery are increased.

2. Description of the Related Art

Generally, an electronic device employing a battery, for example, a portable computer such as a laptop computer, a notebook computer, a personal digital assistant (PDA) or the like, a mobile phone, a compact disc (CD) player, a video camcorder, etc., has been widely used because it is portable and capable of being used while a user moves. Further, such portable electronic devices are generally capable of employing a commercial alternating current (AC) power source via an adapter as well as the battery as the power source for the device.

As the various portable electronic devices are developed, technology related to the battery used in the portable electronic devices is becoming more important. The reason why the technology related to the battery is important is because the power supply is indispensable in the case where a user uses the portable electronic device while moving. Accordingly, various technologies have been developed to increase the capacity and running time of the battery. Further, there has been actively researched a method of increasing running time of the portable electronic device under the same battery power, that is, a method of minimizing power consumption of the portable electronic device.

Figure 1:
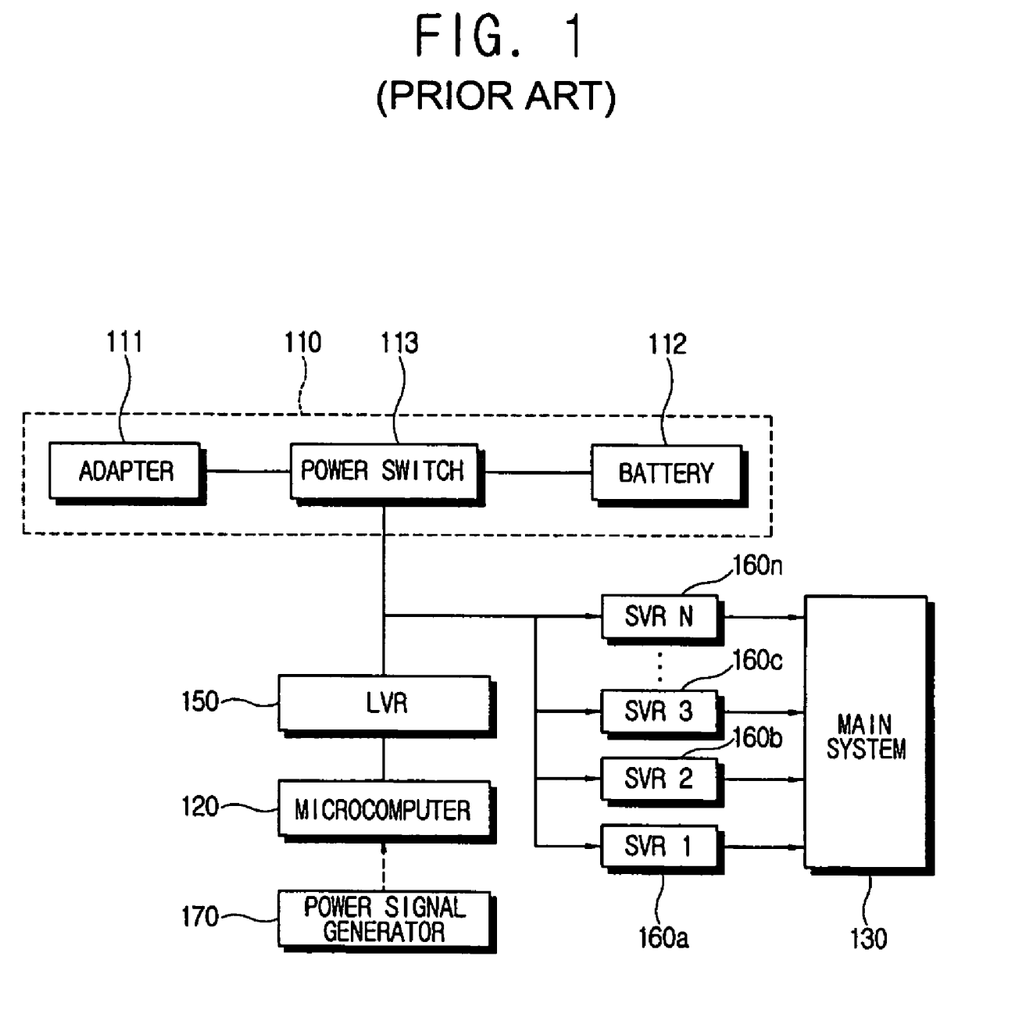
FIG. 1 is a control block diagram of a conventional electronic device.

FIG. 1 is a control block diagram illustrating a power supplying system in a conventional electronic device. As shown therein, a conventional electronic device comprises a main system 130 provided with a plurality of electronic components to perform a main function of the electronic device; a power supply 110 including an adapter 111 and/or a battery 112 to supply power to the electronic device; and a microcomputer 120 controlling the power supplied from the power supply 110. Further, the conventional electronic device comprises a linear voltage regulator (LVR) 150 to regulate the power supplied from the power supply 110 into power for driving the microcomputer 120; and a plurality of switching voltage regulators (SVR) 160a, 160b, 160c and 160n to regulate the power supplied from the power supply 110 into power to drive the plurality of electronic components of the main system 130, respectively.

The microcomputer 120 receives the power from the linear voltage regulator 150 and is generally maintained in a turned on state even when the electronic device is turned off. Here the microcomputer 120 senses whether a power signal is output from a power signal generator 170 when a user pushes a power button (not shown) and controls the power supplied from the respective switching voltage regulators 160a, 160b, 160c and 160n to the main system 130, thereby turning on or off the electronic device.

A power switch 113 controls supply of power from one of the adapter 111 and the battery 112 to the linear voltage regulator 150 and the switching voltage regulators 160a, 160b, 160c and 160n.

The linear voltage regulator 150 is generally employed to supply the power to the microcomputer 120 because it has advantages of stable constant voltage output, low ripple voltage, and low noise. Further, each switching voltage regulator 160a, 160b, 160c and 160n is generally employed to supply the power to the respective electric components of the main system 130 requiring various voltage levels. For example, in a mobile phone, the display may be supplied with a different voltage level than the microprocessor. The SVR arrangement has advantages such as that the power-transformation efficiency is relatively high, and the size and the weight thereof are small and light, respectively. For example, a transformer in a switching voltage regulator can have a small size because the switching voltage regulator 160a, 160b, 160c and 160n operates at high frequency, and heat generation is relatively low.

However, in the conventional power supplying system, where the linear voltage regulator 150 is employed to supply the power required to drive the microcomputer 120, there arises a problem that the low power-transformation efficiency of the linear voltage regulator 150 inherently incurs a heavy power loss. Specifically, the linear voltage regulator 150 has a power transformation efficiency of about 17%, so that the linear voltage regulator 150 results in a loss of 80% or more of the input power.

Particularly, in a portable electronic device, the forgoing unwanted power loss of the power supply system is closely interrelated with the running time of the battery 112 for the portable electronic device, so that technology for reducing the power loss is badly needed even if the power loss is slight.

Instead of the linear voltage regulator, if the switching voltage regulator that has an inherent power-transformation efficiency higher than that of the linear voltage regulator is employed to supply the power to the microcomputer, an additional control circuit (not shown) to control the switching voltage regulator is required. However, total power consumption due to the control circuit and the switching voltage regulator is greater than that due to the linear voltage regulator, so that the switching voltage regulator is inadequate for supplying the power to the microcomputer.

SUMMARY OF THE INVENTION

Accordingly, it is an aspect of the present invention to provide an electronic device and a control method thereof, in which power required to drive the electronic device is relatively low such that, for example, in the case of a portable electronic device using a battery, a running time and a life span of a battery are increased.

The foregoing and/or other aspects of the present invention are achieved by providing an electronic device with a plurality of electronic components, the electronic device including a microcomputer; a first regulator supplying power required to drive the microcomputer in a first mode of the electronic device; a second regulator supplying power required to drive at least one among the plurality of electronic components in a second mode of the electronic device; and a controller controlling the power from the second regulator to be employed as power for driving the microcomputer when the electronic device operates in the second mode.

Additional aspects and/or advantages of the invention will be set forth in part in the description which follows and, in part, will be obvious from the description, or may be learned by practice of the invention.

According to an aspect of the invention, the second regulator has higher power transformation efficiency than the first regulator.

According to an aspect of the invention, the first regulator includes a linear voltage regulator.

According to an aspect of the invention, the second regulator includes a switching voltage regulator generating power having a voltage level required to drive the microcomputer.

According to an aspect of the invention, the controller includes a first diode connected to an output terminal of the first regulator in a forward biased direction, and a second diode connected to an output terminal of the second regulator in the forward biased direction.

According to another aspect of the invention, the controller includes a diode connected to an output terminal of the first regulator in a forward biased direction; a switch controlling the power to be supplied from the second regulator to the microcomputer; and a switching controller turning on the switch when the power is supplied from the second regulator.

According to an aspect of the invention, the switching controller controls the microcomputer according to whether the power is supplied from the second regulator.

According to an aspect of the invention, the switching controller shuts down the first regulator when the power is supplied from the second regulator.

According to an aspect of the invention, the controller includes a shut_down signal generator which shuts down the first regulator when the power is supplied from the second regulator.

According to an aspect of the invention, the shut_down signal generator includes a switching voltage regulator which supplies power required to drive at least one among the plurality of electric components of the electronic device.

According to an aspect of the invention, the shut_down signal generator includes the microcomputer which shuts down the first regulator when the power is supplied from the second regulator.

According to an aspect of the invention, the shut_down signal generator shuts down the first regulator when a predetermined period of time is elapsed after the second regulator supplies the power to the microcomputer.

According to an aspect of the invention, the shut_down signal generator controls the first regulator to be able to supply the power to the microcomputer before the power from the second regulator is cut off as the electronic device is turned off.

According to another aspect of the invention, the electronic device further includes a power supply to supply power to the first and second regulators, the power supply includes at least one of an adapter and a battery.

According to an aspect of the invention, the second regulator outputs the power when the electronic device is turned on.

According to an aspect of the invention, the first mode defines a state that the second regulator does not output the power, and the second mode defines a state that the second regulator outputs the power.

According to an aspect of the invention, the first mode includes an off-mode to define an off-state of the electronic device.

According to another aspect of the invention, an electronic device with a plurality of electric components includes a microcomputer; a first regulator supplying power required to drive the microcomputer in a first mode of the electronic device; a second regulator supplying power required to drive at least one among the plurality of electric components in a second mode of the electronic device; and a controller controlling the first regulator to output the power to the microcomputer before the power from the second regulator is cut off as the electronic device is converted from the second mode to the first mode.

According to an aspect of the invention, the first regulator includes a linear voltage regulator.

According to an aspect of the invention, the second regulator includes a switching voltage regulator generating power having a voltage level required to drive the microcomputer.

According to another aspect of the invention, a method of controlling the electronic device including a plurality of electronic devices, a microcomputer, a first regulator supplying power required to drive the microcomputer, and a second regulator supplying power required to drive at least one among the plurality of electric components, the method includes supplying the power from the second regulator to be employed as power for driving the electronic device when the second regulator outputs the power; and supplying the power from the first regulator to the microcomputer when the second regulator does not output the power.

According to another aspect of the invention, the method of controlling the electronic device further includes shutting down the first regulator when a predetermined period of time is elapsed after the second regulator supplies the power to the microcomputer.

According to another aspect of the invention, the second regulator outputs the power when the electronic device is turned on.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 2:
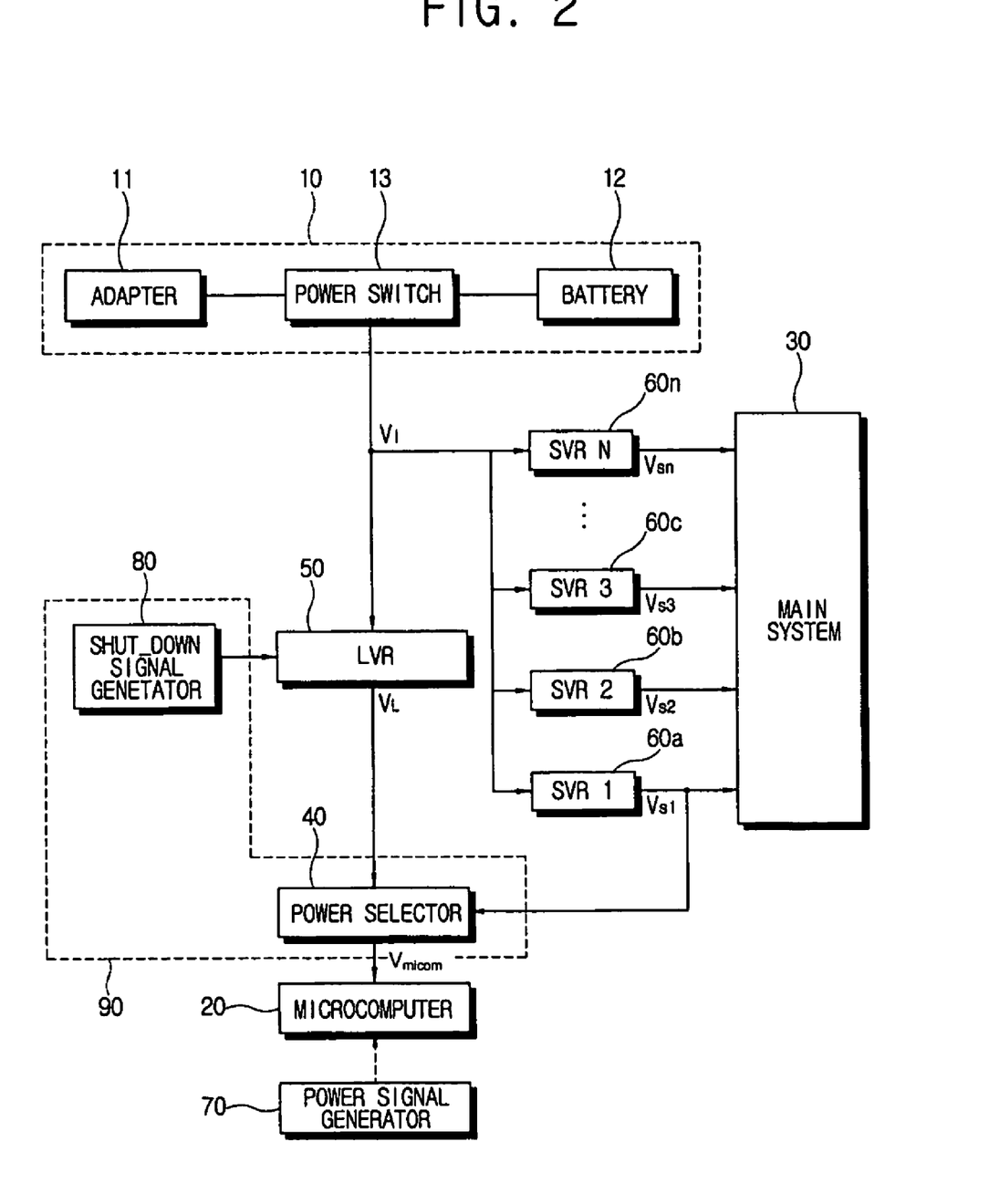
FIG. 2 is a control block diagram of an electronic device according to an embodiment of the present invention.

As shown in FIG. 2, an electronic device according to an embodiment of the present invention comprises a power supply 10, a main system 30, a microcomputer 20, a first regulator 50, a plurality of second regulators 60a, 60b, 60c and 60n, and a controller 90. Here, according to an embodiment of the present invention it is assumed that the first regulator 50 is a linear voltage regulator and each of the second regulators 60a, 60b, 60c and 60n is a switching voltage regulator.

The power supply 10 supplies power ($V_1$) to drive the electronic device including the main system 30 and/or the microcomputer 20. According to an embodiment of the present invention, the power supply 10 comprises an adapter 11 to convert commercial AC power into direct current (DC) power and/or a battery 12. Here, the battery 12 is removably provided in the electronic device. Further, the battery 12 may be a secondary battery which is rechargeable by a charger (not shown).

The main system 30 comprises a plurality of electronic components performing a main function of the electric device. For example, in the case of a portable computer, the main system 30 comprises a central processing unit (CPU), a memory such as a random access memory (RAM), a chipset, a main board, a graphic card, etc. Here, the electronic components of the main system 30 are operated by the power $V_{S1}$, $V_{S2}$, $V_{S3}$ and $V_{SN}$ of various voltage levels supplied from the switching voltage regulators 60a, 60b, 60c and 60n, respectively.

The linear voltage regulator 50 transforms the power supplied from the power supply 10 into power $V_{micom}$ (hereinafter, referred to as "driving power") adapted to drive-the microcomputer 20. Here, the controller 90 controls the power $V_L$ outputted from the linear voltage regulator 50 to be supplied to the microcomputer 20 or cut off.

The microcomputer 20 controls the switching voltage regulators 60a, 60b, 60c and 60n to output the power on the basis of a power signal generated from a power signal generator 70, and manages the power $V_{S1}$, $V_{S2}$, $V_{S3}$ and $V_{SN}$ to be supplied to the electronic components of the main system 30, thereby turning on or off the electronic device. In an aspect, the power signal generator 70 generates the power signal to turn on or off the electronic device when a power button (not shown) provided in the electronic device or a remote controller (not shown) is pushed by a user.

The switching voltage regulators 60a, 60b, 60c and 60n are controlled by the microcomputer 20 to transform the power $V_1$, into power of various voltage levels (i.e., $V_{S1}$, $V_{S2}$, $V_{S3}$ and $V_{SN}$) adapted to specifications of the electric components of the main system 30, respectively, thereby supplying the required power to each of the electronic components. For example, in the case of the portable computer, the switching voltage regulators 60a, 60b, 60c and 60n output the power of various voltage levels, e.g., ±5V, ±3.3V, ±2.5V, etc., adapted for driving the electronic components of the portable computer, so that the power of the various voltage levels is selectively supplied to the electronic components such as the CPU, the memory, the chipset, the main board, and the graphic card, etc., as the power to drive each electronic component and for signal transmission.

According to an embodiment of the present invention, at least one of the switching voltage regulators 60a, 60b, 60c and 60n outputs the power having the voltage level equal to that of the power $V_L$ output from the linear voltage regulator 50. That is, at least one of the switching voltage regulators 60a, 60b, 60c and 60n outputs the power having the voltage level equal to that of the driving power $V_{micom}$ for the microcomputer 20. According to an embodiment of the present invention, the driving power $V_{micom}$ for the microcomputer 20 has a voltage level of 3.3V, and the power $V_{S1}$ output from the first switching voltage regulator 60a among the switching voltage regulators 60a, 60b, 60c and 60n has a voltage level of 3.3V.

According to an embodiment of the present invention, the controller 90 comprises a power selector 40 to select which one between the power $V_{L1}$ output from the linear voltage regulator 50 and the power $V_{S1}$ output from the first switching voltage regulator 60a will be used as the driving power $V_{micom}$ for the microcomputer 20. According to an embodiment of the present invention, the power selector 40 selects the power $V_{S1}$ output from the first switching voltage regulator 60a to be supplied to the microcomputer 20 in the case where the first switching voltage regulator 60a outputs the power having the voltage level equal to that of the driving power $V_{micom}$ for the microcomputer 20.

That is, while the electronic device is turned off, the first switching voltage regulator 60a does not output the power $V_{S1}$ but the linear voltage regulator 50 outputs the power $V_L$ to keep the microcomputer 20 turned on. At this time, the power selector 40 selects the power $V_L$ output from the linear voltage regulator 50 to be employed as the driving power $V_{micom}$ for the microcomputer 20.

Oppositely, when a user turns on the electronic device by pushing the power button, the microcomputer 20 controls the switching voltage regulators 60b, 60c and 60n as well as the first switching voltage regulator 60a to supply the power $V_{S1}$, $V_{S2}$, $V_{S3}$ and $V_{SN}$ to the electronic components of the main system 30 according to the power signal from the power signal generator 70, respectively. In this case, the first switching regulator 60a outputs the power $V_{S1}$ having the voltage level equal to that of the driving power $V_{micom}$ for the microcomputer 20, so that the power selector 40 cuts off the power $V_L$ supplied from the linear voltage regulator 50 to the microcomputer 20 and selects the power $V_L$ outputted from the linear voltage regulator 50 to be supplied to the microcomputer 20.

Meanwhile, according to an embodiment of the present invention, the controller 90 further comprises a shut_down signal generator 80 generating a shut_down signal to shut down the linear voltage regulator 50. Here, the shut_down signal generator 80 generates the shut_down signal when the first switching regulator 60a outputs the power $V_{S1}$ having the voltage level equal to that of the driving power $V_{micom}$ for the microcomputer 20, thereby preventing the linear voltage regulator 50 from outputting the power $V_L$. Thus, when the microcomputer 20 is supplied with the power $V_{S1}$ from the first switching regulator 60a, the linear voltage regulator 50 is not operated, so that there is no power loss due to the operation of the linear voltage regulator 50.

A power switch 13 selectively supplies the power from one of the adapter 11 and the battery 12 to the linear voltage regulator 50 and the switching voltage regulators 60a, 60b, 60c and 60n. Here, the power switch 13 may be a diode respectively connected to output terminals of the adapter 11 and the battery 12 in a forward-biased direction, and a switching device such as a field effect transistor (FET) or the like, such that the power from one of the adapter 11 and the battery 12 is supplied to the linear voltage regulator 50 and the switching voltage regulators 60a, 60b, 60c and 60n.

Figure 3:
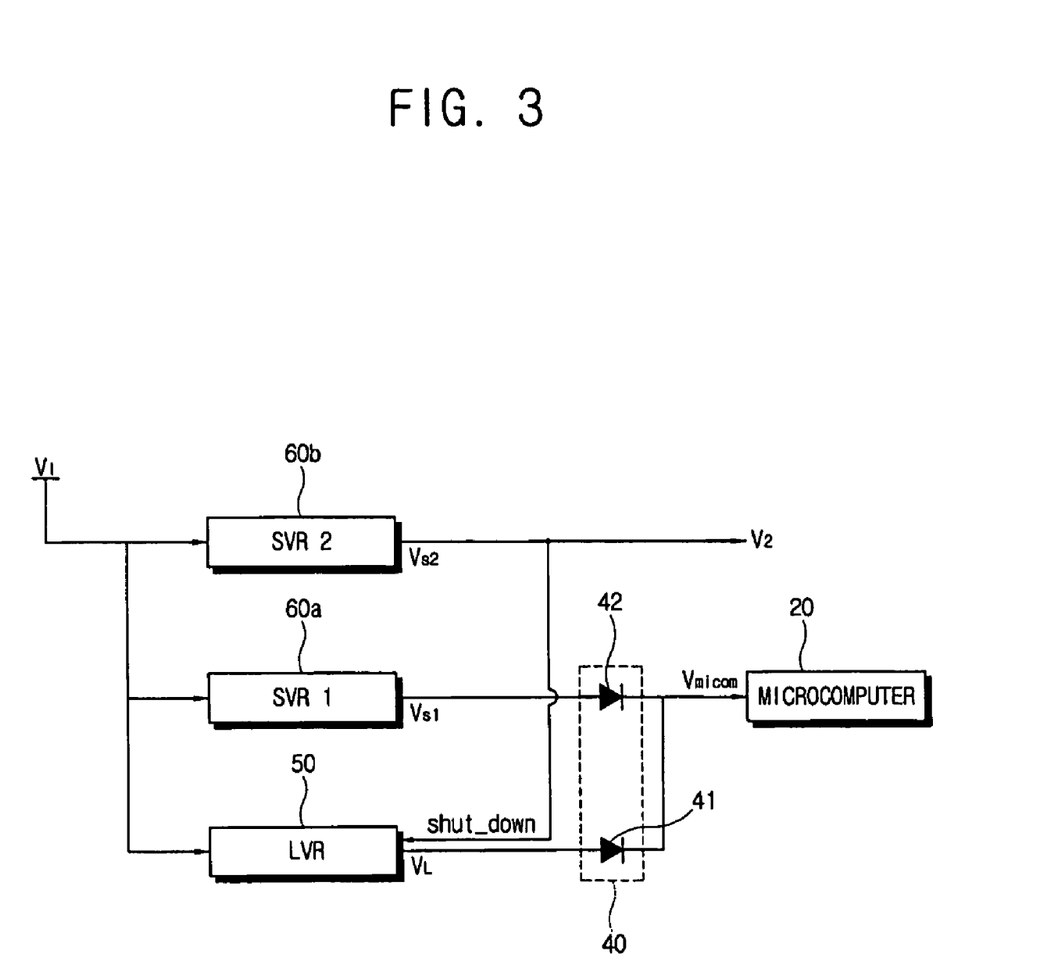
FIG. 3 is a schematic block diagram illustrating an electronic device according to another embodiment of the present invention.

FIG. 3 is a view illustrating an electronic device according to an embodiment of the present invention. As shown therein, a power selector 40 comprises a first diode 41 connected to an output terminal of the linear voltage regulator 50 in a forward biased direction, and a second diode 42 connected to an output terminal of the first switching voltage regulator 60a in a forward biased direction. Thus, the microcomputer 20 is supplied with the power having a greater voltage level between the power $V_L$ output from the linear voltage regulator 50 and the power $V_{S1}$ output from the first switching voltage regulator 60a, wherein the power having the greater voltage level is used as the driving power $V_{micom}$.

The shut_down signal generator 80, shown in FIG. 3 may be another switching voltage regulator outputting the power $V_{S1}, V_{S2}, V_{S3}$ and $V_{SN}$ required for the electronic components. For example, the shut_down signal generator 80 may be the second switching voltage regulator 60b. In the case that the linear voltage regulator 50 has a specification requiring a shut_down signal having a voltage level of 5V, the output terminal of the switching voltage regulator outputting the voltage level of 5V is electrically connected to a shut_down input pin (not shown) of the linear voltage regulator 50. Thus, when the electronic device is turned on, the switching voltage regulators 60b, 60c and 60n as well as the first switching voltage regulator 60a outputs the power. Here the power selector 40 selects the power $V_{S1}$ from the first switching voltage regulator 60a to be used as the driving power $V_{micom}$ for the microcomputer 20 and turns off the power of 5V from the second switching voltage regulator 60b by shutting down the linear voltage regulator 50, thereby preventing the linear voltage regulator 50 from outputting the power $V_L$.

Figure 4A:
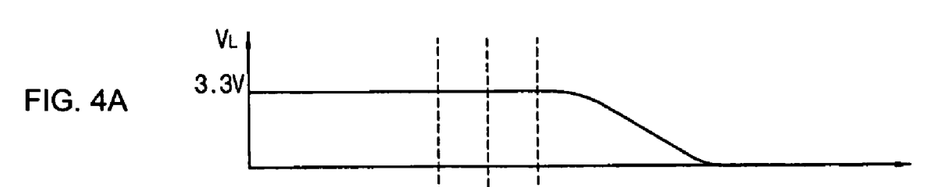
FIGS. 4A-4D are views illustrating the operation of the electric device of FIG. 3.
Figure 4B:
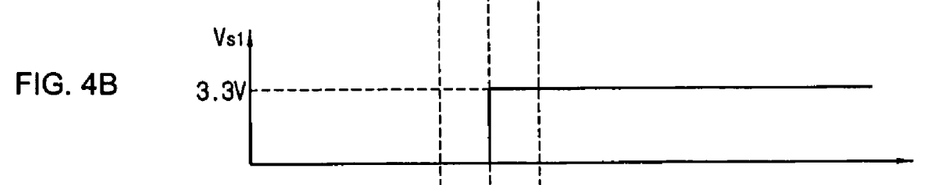
Figure 4C:
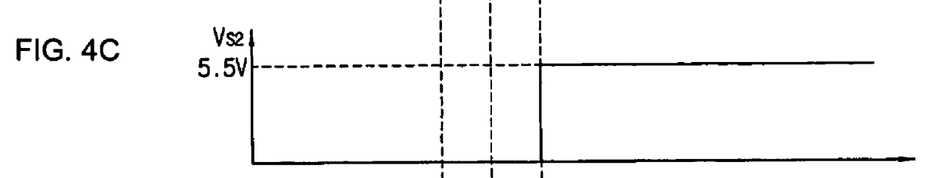
Figure 4D:
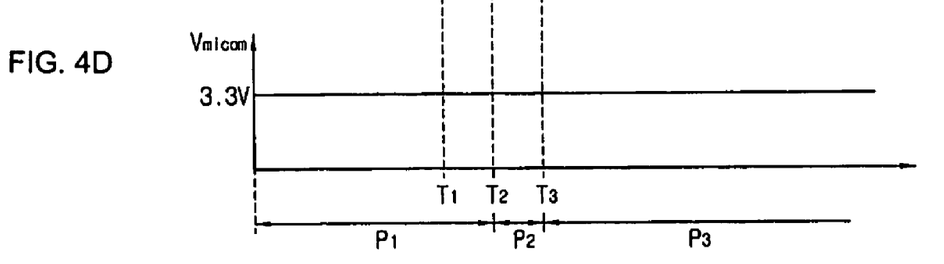

Referring to FIGS. 4A-4D, operations of the electronic device shown in FIG. 3 will be described as follows. First, while the electronic device is turned off, the linear voltage regulator 50 outputs the power $V_L$ having a voltage of 3.3V for driving the microcomputer 20, as shown in FIG. 4A but the first and second switching voltage regulators 60a and 60b do not output the power $V_{S1}$ and $V_{S2}$ as shown in FIGS. 4B and 4C. At this time, the power $V_L$ from the linear voltage regulator 50 is selected to be employed as the driving power $V_{micom}$ for the microcomputer 20 by the power selector 40.

Referring to FIGS. 4A-4D, when a user turns on the electronic device at a T1 point, the switching voltage regulators 60b, 60c and 60n as well as the first switching voltage regulator 60a outputs the power $V_{S1}, V_{S2}, V_{S3}$ and $V_{SN}$. Here, intervals between the T1 point at which the electronic device is turned on, a T2 point at which the first switching voltage regulator 60a outputs the power $V_{S1}$, and a T3 point at which the second switching voltage regulator 60b outputs the power $V_{S2}$ are due to signal and power delays or a predetermined power supplying sequence for each electric/electronic device of the main system 30.

At the T2 point at which the first switching voltage regulator 60a outputs the power $V_{S1}$ of 3.3V, the power selector 40 selects the power having a greater voltage level between the power $V_L$ output from the linear voltage regulator 50 and the power $V_{S1}$ output from the first switching voltage regulator 60a to be employed as the driving power $V_{micom}$ for the microcomputer 20. Substantially, in the interval of P2, the power having the greater voltage level between the power $V_L$ output from the linear voltage regulator 50 and the power $V_{S1}$ output from the first switching voltage regulator 60a is selectively employed as the driving power $V_{micom}$ for the microcomputer 20.

Further, at the T3 point at which the second switching voltage regulator 60b outputs the power $V_{S2}$ of approximately 5V, the linear voltage regulator 50 is shut down, thereby preventing the linear voltage regulator 50 from outputting the power $V_L$. Thus, in the interval of P3, only the power $V_{S1}$ is supplied from the first switching voltage regulator 60a to the microcomputer 20, thereby improving power-transformation efficiency.

Further, the interval of P1 shown in FIGS. 4A-4D is a period of time during which the power $V_L$ from the linear voltage regulator 50 is used as the driving power $V_{micom}$ for the microcomputer 20 in the state that the electronic device is turned off.

Figure 5:
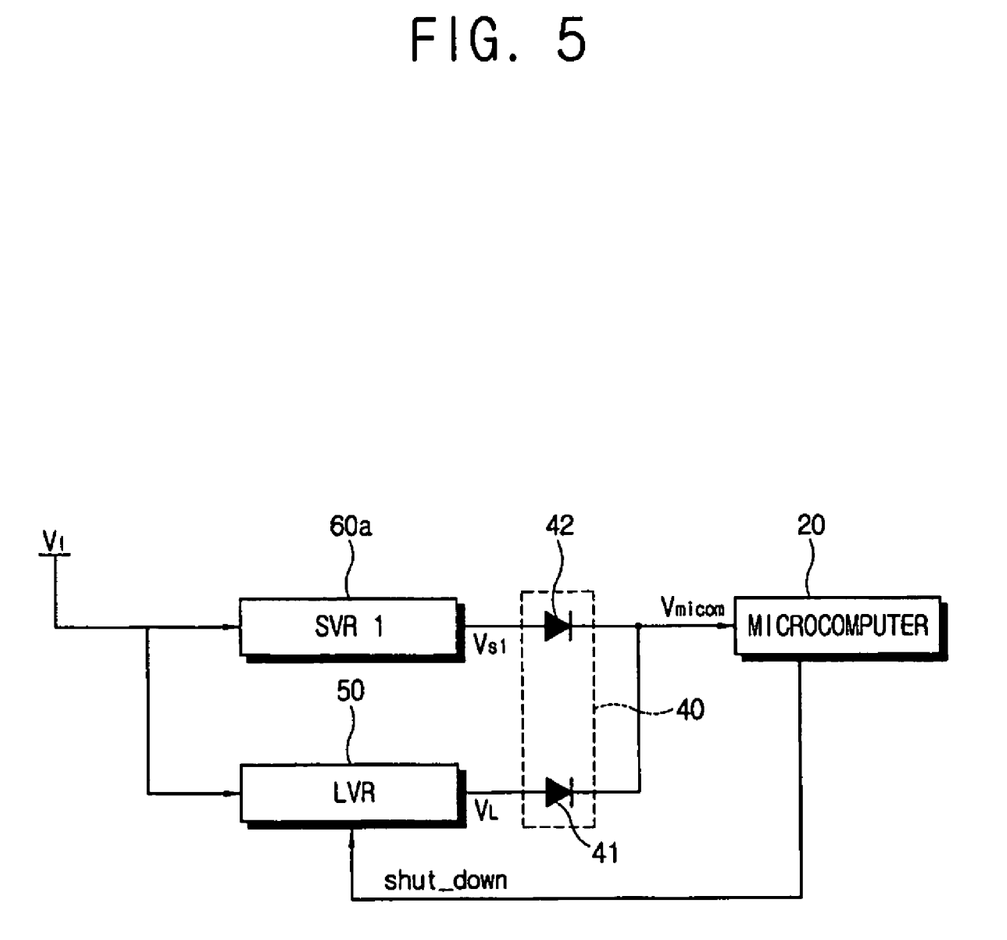
FIG. 5 is a view illustrating an electronic device according to another embodiment of the present invention.

FIG. 5 is a view illustrating an electronic device according to another embodiment of the present invention. In FIG. 5 like reference numerals refer to the like elements shown in FIGS. 2 and 3, and repetitive description thereof will be avoided as necessary.

Referring to FIG. 5, the shut_down signal generator 80 is comprised of the microcomputer 20. Here, the microcomputer 20 generates the shut_down signal when the first switching voltage regulator 60a outputs the power $V_{S1}$ having the voltage level for driving the microcomputer 20.

Further, the microcomputer 20 generates the shut_down signal in response to sensing whether the first switching voltage regulator 60a outputs the power $V_{S1}$ having the voltage level equal to that of the driving power $V_{micom}$ for the microcomputer 20. Also, when a predetermined period of time is elapsed after the power signal from the power signal generator 70 is sensed, it is determined that the first switching voltage regulator 60a outputs the power $V_{S1}$ having the voltage level equal to that of the driving power $V_{micom}$ for the microcomputer 20. That is, the microcomputer 20 does not generate the shut_down signal until the first switching voltage regulator 60a outputs the power $V_{S1}$ having the voltage level equal to that of the driving power $V_{micom}$ for the microcomputer 20, thereby stably supplying the driving power $V_{micom}$ to the microcomputer 20.

Figure 6:
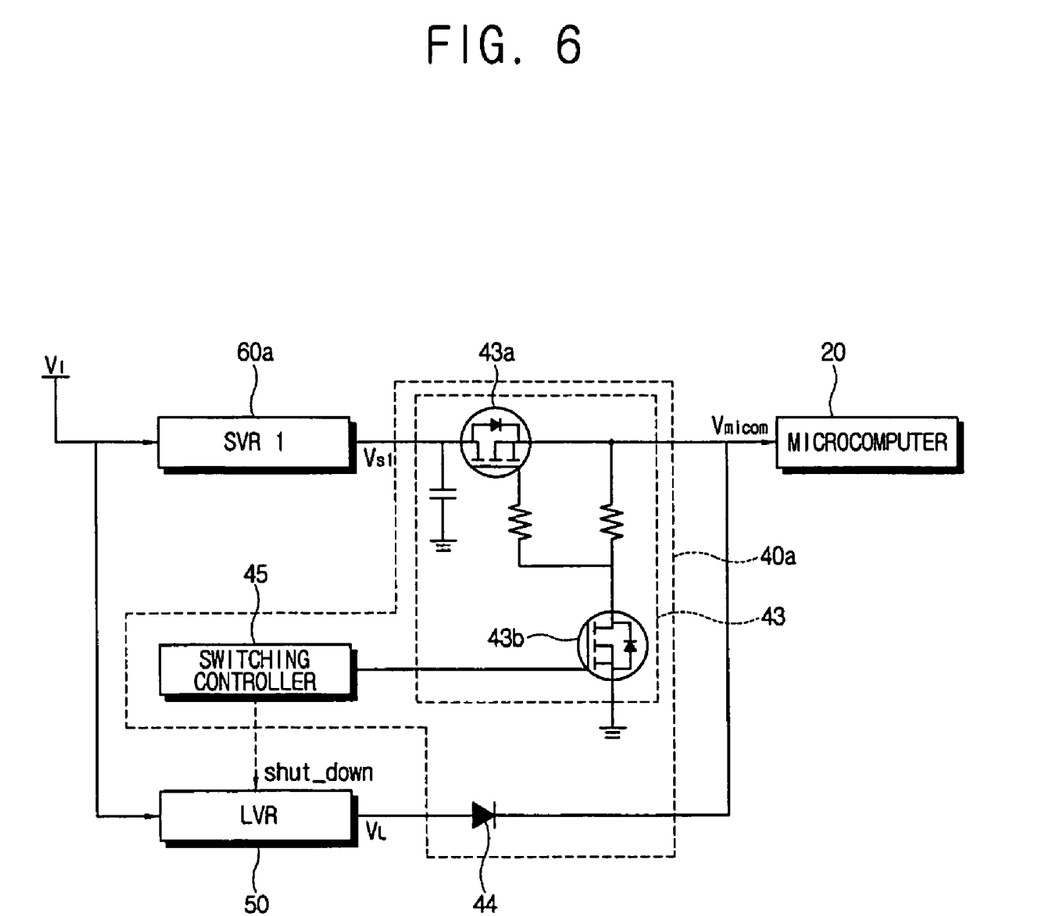
FIG. 6 is a view illustrating an electronic device according to another embodiment of the present invention.
Figure 7A:
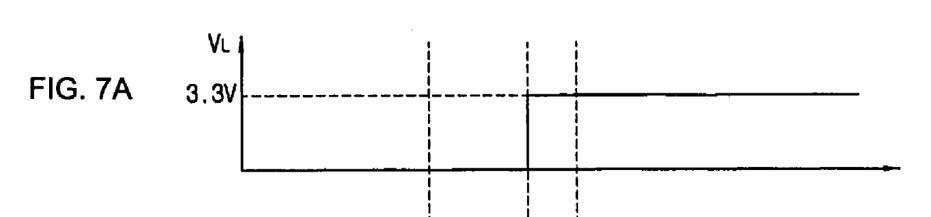
FIGS. 7A-7D are graphs illustrating a process during which the electronic device is turned off according to the embodiments of the present invention.
Figure 7B:
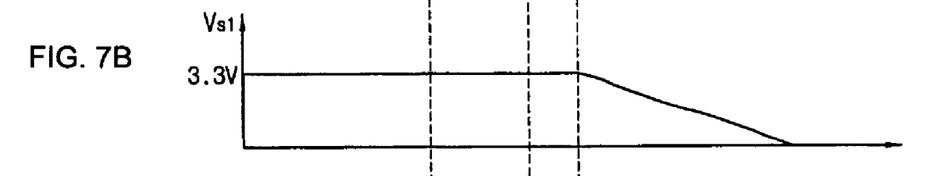
Figure 7C:
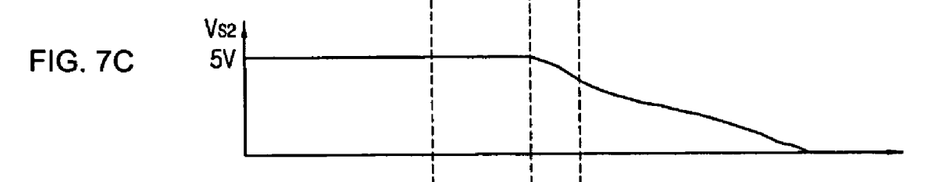
Figure 7D:
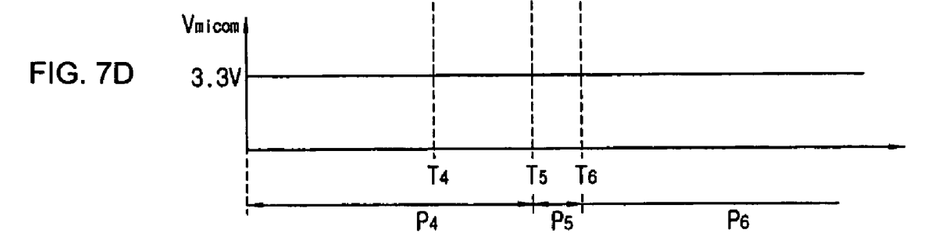

FIG. 6 is a view illustrating an electronic device according to another embodiment of the present invention. In FIG. 6, like reference numerals refer to the like elements of FIGS. 2 and 3, and repetitive description thereof will be avoided as necessary.

Referring to FIG. 6, a power selector 40a comprises a diode 44 connected to the output terminal of the linear voltage regulator 50 in a forward biased direction, a switch 43 controlling the power to be supplied or not from the switching voltage regulators 60a, 60b, 60c, 60n to the microcomputer 20, and a switching controller 45 turning on/off the switch 43.

The switch 43 comprises at least one switching device 43a and 43b such as an FET, which is turned on/off in response to the control of the switching controller 45.

The switching controller 45 turns on/off the switch 43 according to whether the first switching voltage regulator 60a outputs the power $V_{S1}$ having the voltage level equal to that of the driving power $V_{micom}$ for the microcomputer 20. For example, the switching controller 45 turns on the switch 43 when at least one of the switching voltage regulators 60a, 60b, 60c and 60n outputs the power $V_{S1}$ having the voltage level equal to that of the driving power $V_{micom}$ for the microcomputer 20. In this case, the power from the linear voltage regulator 50 is cut off by the properties of the diode 44, that is, by a voltage property between an anode and a cathode of the diode 44, and only the power from the switching voltage regulators 60a, 60b, 60c and 60n is used as the driving power $V_{micom}$ for the microcomputer 20.

In another aspect, the switching controller 45 may be comprised of the microcomputer 20, wherein the microcomputer 20 controls the switch 43 according to whether the switching voltage regulators 60a, 60b, 60c and 60n output the power $V_{S1}$ having the voltage level equal to that of the driving power $V_{micom}$ for the microcomputer 20. Further, the switching controller 45 may be a separate element to control the switch 43 according to whether the switching voltage regulators 60a, 60b, 60c and 60n output the power $V_{S1}$ having the voltage level equal to that of the driving power $V_{micom}$ for the microcomputer 20.

Further, the switching controller 45, as shown in FIG. 6, generates the shut_down signal according to whether the first switching voltage regulator 60a outputs the power $V_{S1}$ having the voltage level equal to that of the driving power $V_{micom}$ for the microcomputer 20. The switching controller 45 turns on the switch 43 and waits for a predetermined period of time until the first switching voltage regulator 60a can output the power $V_{S1}$ having the voltage level equal to that of the driving power $V_{micom}$ for the microcomputer 20. When the period of time is elapsed after the first switching voltage regulator 60a outputs the power $V_{S1}$ having the voltage level equal to that of the driving power $V_{micom}$ for the microcomputer 20, the switching controller 45 generates the shut_down signal to the linear voltage regulator 50, thereby shutting down the linear voltage regulator 50.

Herein below, referring to FIGS. 7A-7D, operations of the electronic device according to an embodiment of the present invention will be described while the device is being turned off.

First, while the electronic device is turned on, that is, during the interval of P4, the power $V_{S1}$ of the first switching voltage regulator 60a is employed as the driving power $V_{micom}$ for the microcomputer 20, and the linear voltage regulator 50 is shut down by the shut_down signal from the shut_down signal generator 80.

At a T4 point, if a user turns off the electronic device, the microcomputer 20 cuts off the power $V_{S1}$, $V_{S2}$, $V_{S3}$ and $V_{SN}$ from the switching voltage regulators 60c and 60n as well as the first and second switching voltage regulators 60a and 60b on the basis of a predetermined power cut-off sequence in response to the power signal of the power signal generator 70.

At this time, the shut_down signal generator 80 controls the linear voltage regulator 50 to be able to output the power $V_L$ at a T5, which is point before the power $V_{S1}$ supplied from the first switching voltage regulator 60a to the microcomputer 20 is cut off. Here, in the case where the shut_down signal generator 80 controls the linear voltage regulator 50 to output the power $V_L$ depending on a logical value of the shut_down signal, the linear voltage regulator 50 is controlled to selectively output the power $V_L$ by changing the logical value of the shut_down signal.

For example, as described above, in the case where the shut_down signal generator 80 comprises the second switching voltage regulator 60b shown in FIG. 3, the power cut-off sequence for the power $V_{S1}$, $V_{S2}$, $V_{S3}$ and $V_{SN}$ from the switching voltage regulators 60a, 60b, 60c and 60n is determined to allow the microcomputer 20 to cut off the power $V_{S2}$ from the second switching voltage regulator 60b to generate the shut_down signal prior to turning off the power $V_{S1}$ from the first switching voltage regulator 60a. Therefore, the power $V_{S2}$ from the second switching voltage regulator 60b is gradually decreased from the T5 point. In another aspect, where the shut_down signal generator 80 comprises the microcomputer 20, the microcomputer 20 controls the linear voltage regulator 50 to be able to output the power $V_L$ at the same time when the power signal is sensed. Therefore, when the electronic device is turned off, the linear voltage regulator 50 can output the power $V_L$ before the power $V_{S1}$ from the first switching voltage regulator 60a is cut off.

Here, the interval of P5 shown in FIGS. 7A-7D illustrates a state that both the first switching voltage regulator 60a and the linear voltage regulator 50 can output the power. Like the interval of P2 shown in FIGS. 4A-4D, during the interval of P5, the power selectors 40, 40a select the power $V_{S1}$ or $V_L$ to be supplied from either the first switching voltage regulator 60a or the linear voltage regulator 50, respectively, to the microcomputer 20. As shown in FIG. 6, the switching controller 45 of the power selector 40a keeps the switch 43 turned on during the interval of P5, thereby allowing the first switching voltage regulator 60a to output the power $V_{S1}$.

Then, at a T6 point, the power selectors 40, 40a select the power $V_L$ from the linear voltage regulator 50 to be employed as the driving power $V_{micom}$ for the microcomputer 20. In the electronic device illustrated in FIGS. 2-5, during the interval of P6, the power $V_{S1}$ from the first switching voltage regulator 60a has a voltage level lower than that of the power $V_L$ from the linear voltage regulator 50. Further, in the electronic device illustrated in FIG. 6, during the interval of P6 the switching controller 45 turns off the switch 43, thereby cutting off the power $V_{S1}$ from the first switching voltage regulator 60a.

In an aspect, the electronic device according to an embodiment of the present invention operates between a first mode and a second mode. Here, the second mode indicates that the first switching voltage regulator 60a outputs the power $V_{S1}$, and the first mode indicates that the first switching voltage regulator 60a does not output the power $V_{S1}$. For example, the first mode includes a state that the electronic device is turned off. Further, even if the electronic device is turned on, when the power from the first switching voltage regulator 60a is cut off due to an advanced configuration and power interface (ACPI) mode as one example of power management methods, the first mode includes the ACPI mode. Similarly, even if the electronic device is turned off, when the first switching voltage regulator 60a outputs the power $V_{S1}$ so as to drive a predetermined electronic component, the second mode includes this state.

Meanwhile, the power selector 40 illustrated in FIGS. 2-5 can be incorporated with the power selector 40a illustrated in FIG. 6. Further, the linear voltage regulator 50 may comprise a separate switch provided in the output terminal thereof.

In the foregoing embodiments, a first regulator 50 comprises the linear voltage regulator, and a second regulator 60a comprises the switching voltage regulator. However, even if the second regulator 60a has a better power transformation efficiency than the first regulator 50, when total power consumption of the second regulator 60a is greater than that of the first regulator 50, another type of regulator may be employed without departing from the principles and spirit of the invention.

Thus, there are provided the microcomputer 20, the first regulator 50 supplying the power $V_{micom}$ to the microcomputer 20 in the first mode, the second regulator 60a supplying the power $V_{S1}$ to at least one among the plurality of electric components in the second mode, and the controller 90 controlling the power $V_{S1}$ from the second regulator 60a to be employed as the power for driving the microcomputer 20 when the electronic device operates in the second mode, thereby lowering the power required to drive the electronic device.

In particular, in the case of a portable electronic device using the battery 12, the running time and the life span of the battery 12 are increased.

As described above, aspects of the present invention provide an electronic device and a control method thereof, in which power required to drive the electronic device is relatively low. In the case of a portable electronic device using a battery, for example, a running time of the portable electronic device and a life span of the battery are increased.

Although a few embodiments of the present invention have been shown and described, it would be appreciated by those skilled in the art that changes may be made in this embodi-

What is claimed is:

1. A power supply apparatus to supply power to a portable electronic device comprising a plurality of electronic components, the power supply apparatus comprising:
   a linear voltage regulator supplying a first power required to drive a microcomputer in an off-mode to define an off-state of the portable electronic device;
   a switching voltage regulator supplying a second power required to drive at least one among the plurality of electric components and the microcomputer in an on-mode to define an on-state of the portable electronic device; and
   a controller controlling the switching voltage regulator to supply the second power to the microcomputer in the on-mode,
   wherein the first power and second power have a similar voltage level, and the controller comprises a shut_down signal generator which shuts down the linear voltage regulator at or after starting the on-mode, and
   the controller comprises a switch controlling the power to be supplied from the switching voltage regulator to the microcomputer, and a switching controller turning on the switch when the second power is supplied in a forward bias direction from the switching voltage regulator.

2. The power supply apparatus according to claim 1, wherein the controller comprises:
   a first diode connected to an output terminal of the linear voltage regulator in a forward biased direction; and
   a second diode connected to an output terminal of the switching voltage regulator in the forward biased direction.

3. The power supply apparatus according to claim 1, wherein the controller further comprises:
   a diode connected to an output terminal of the linear voltage regulator in a forward biased direction.

4. The power supply apparatus according to claim 3, wherein the switching controller controls the microcomputer according to the second power supplied from the switching voltage regulator in the on-mode.

5. The power supply apparatus according to claim 3, wherein the switching controller shuts down the linear voltage regulator at or after starting the on-mode.

6. The power supply apparatus according to claim 1, wherein the linear voltage regulator is shut down by the microcomputer at or after starting the on-mode.

7. The power supply apparatus according to claim 1, wherein the shut_down signal generator controls the linear voltage regulator to supply the first power to the microcomputer before the second power from the second regulator is cut off when the portable electronic device is turned off.

8. The power supply apparatus according to claim 1, further comprising a power supply to supply power to the linear and switching voltage regulators,
   the power supply comprises at least one of an adapter and a battery.

9. The power supply apparatus according to claim 1, wherein the switching voltage regulator outputs the second power to the microcomputer when the portable electronic device is turned on.

10. The power supply apparatus according to claim 1, wherein the off-mode defines a state that the switching voltage regulator does not output the second power, and the on-mode defines a state that the switching voltage regulator outputs the second power.

11. A method of controlling a power supply apparatus comprising a portable electronic device having a plurality of electronic components, a linear voltage regulator supplying a first power required to drive a microcomputer in an off-mode to define an off-state of the portable electronic device, and a switching voltage regulator supplying a second power required to drive at least one among the plurality of electronic components in an on-mode to define an on-state of the portable electronic device, the method comprising:
   supplying the first power from the linear voltage regulator to the microcomputer in the off-mode;
   supplying the second power from the switching voltage regulator to the at least one among the plurality of electronic components and the microcomputer in the on-mode; and
   shutting down the linear voltage regulator at or after starting the on-mode,
   wherein the first power and the second power have a similar voltage level, and
   the controller comprises a switch controlling the power to be supplied from the switching voltage regulator to the microcomputer, and a switching controller turning on the switch when the second power is supplied in a forward bias direction from the switching voltage regulator.

12. The method according to claim 11, wherein the switching voltage regulator outputs the second power when the portable electronic device is turned on.

* * * * *